United States Patent [19]

Snyder et al.

[11] Patent Number: 5,649,300

[45] Date of Patent: Jul. 15, 1997

[54] MESSAGE DELIVERY SYSTEM AND METHOD THEREFOR

[75] Inventors: Jerome F. Snyder; Francis G. Fuson, both of Las Vegas, Nev.

[73] Assignee: Rotec, A Nevada General Partnership, Las Vegas, Nev.

[21] Appl. No.: 227,070

[22] Filed: Apr. 13, 1994

[51] Int. Cl.⁶ .................... H04B 1/00; H04B 7/00

[52] U.S. Cl. .................. 455/517; 455/3.1; 455/66; 340/905

[58] Field of Search .......... 455/54.1, 70, 186.1, 455/3.1, 6.3, 38.2, 38.4, 66, 38.1, 51.2; 340/905, 996, 993

[56] References Cited

U.S. PATENT DOCUMENTS

| | | | |
|---|---|---|---|
| 2,904,674 | 9/1959 | Crawford | 250/6 |
| 3,597,689 | 8/1971 | Ferrell | 325/51 |
| 3,899,671 | 8/1975 | Stover | 235/150.2 |
| 4,270,117 | 5/1981 | Ziegelbein et al. | 340/168 B |
| 4,276,653 | 6/1981 | Aarsen et al. | 455/56 |
| 4,510,622 | 4/1985 | Mori et al. | 455/67 |
| 4,541,119 | 9/1985 | Cooper et al. | 455/127 |
| 4,644,347 | 2/1987 | Lucas et al. | 340/825.04 |
| 4,870,696 | 9/1989 | Yorita | 455/49 |
| 5,020,143 | 5/1991 | Duckeck et al. | 455/186 |
| 5,065,452 | 11/1991 | Duckeck et al. | 455/226 |
| 5,214,793 | 5/1993 | Conway et al. | 455/49.1 |
| 5,235,633 | 8/1993 | Dennison et al. | 455/12.1 |

FOREIGN PATENT DOCUMENTS

| | | |
|---|---|---|
| 0349470 | 3/1989 | European Pat. Off. . |
| 2130374 | 7/1982 | United Kingdom . |

*Primary Examiner*—Edward F. Urban
*Assistant Examiner*—Gertrude Arthur
*Attorney, Agent, or Firm*—Meschkow & Gresham, P.L.C.

[57] ABSTRACT

A message delivery system (12) automatically delivers messages (44) through mobile units (20) as the mobile units (20) travel within a predetermined area (10). Each message (44) is delivered only when the mobile unit (20) is near a point of interest (16) which is the subject of the message's content. Each message (44) is delivered in its entirety, from beginning to end, without repetition. Que points (24) are defined to reside before corresponding points of interest (16) when mobile units (20) travel in particular directions. Based upon these particular directions of travel, message content may be configured to describe points of interest (16) using left or right relative directional references. Messages (44) are delivered in real time, and their content may change quickly and frequently. A control station (18) controls the programming of the mobile units (20) and sends programming communications (48) over the air to change mobile unit programming as needed.

24 Claims, 4 Drawing Sheets

MESSAGE DELIVERY SYSTEM AND METHOD THEREFOR

TECHNICAL FIELD OF THE INVENTION

The present invention relates generally to message delivery systems. More specifically, the present invention relates to message delivery systems in which messages whose contents are related to geographic points of interest are delivered through mobile units when the mobile units are near the points of interest.

BACKGROUND OF THE INVENTION

Message delivery systems that deliver messages whose contents are related to geographic points of interest are highly valued by travelers. Generally, as a traveler moves past a point of interest covered by such a message delivery system, the system delivers, performs, displays, announces, or otherwise conveys a message to the traveler. Desirably, this message imparts information that describes or otherwise relates to the point of interest being passed.

In a primitive form of such a message delivery system, travelers view a sign that informs them to tune their radios to a particular channel or frequency where they may receive a recorded message. Typically, the range of the station delivering the message is either undesirably large or undesirably small. When the range is too large, precise matching of message delivery to the geographic point of interest is difficult. The message may be received even when the traveler is nowhere near the point of interest. Messages are typically repeated one or more times as the traveler moves through the range of reception. The repetition of messages is particularly annoying to a traveler because a traveler in an unfamiliar area may otherwise be nearly overwhelmed with new information. In addition, only a limited number of messages may be delivered for a given geographic area.

When the range is too small, radio reception is typically poor even when the traveler is precisely at the point of interest. When the traveler moves through this small range, an entire message may not get delivered while the traveler's radio is within range.

In either case, a message is often delivered starting somewhere in the middle of the message rather than at a beginning of a message. In a typical scenario, the traveler first experiences a message from middle to end, then waits for the message to repeat. If the delivery range is sufficiently large and if the traveler waits long enough, he or she then experiences the message from beginning to middle, at which point the message repeats for the traveler. Starting message delivery in the middle is undesirable because it is more difficult for a traveler to understand the ending parts of a message when the beginning parts have not yet been delivered.

Attempts have been made to improve upon such primitive systems. However, such attempts typically cause other serious problems. For example, systems have been designed to broadcast message index codes which are evaluated by special purpose receivers. Each receiver has a repertoire of stored messages, and each receiver delivers the message from the repertoire that corresponds to the received index. This message may be delivered from beginning to end. However, this special purpose receiver is inflexible for message changes and is difficult to customize for areas having a dense distribution of points of interest. Typically, drivers of vehicles equipped with such special purpose radios must be extensively involved in tuning radios and in insuring that the radios remain programmed with a current repertoire of messages.

Moreover, conventional message delivery systems fail to provide an implementation that is well suited for public transportation. Systems that require vehicle drivers to tune a radio to specific stations are not suited for public transportation. Driver cooperation is an essential element of successful message delivery, and the drivers are typically uninterested in receiving the messages.

In addition, travelers in public transportation, such as tourists who may have arrived in a particular city by aircraft, may be disoriented as to north, south, east, and west absolute directions. Conventional message delivery systems do not impart relative directional information, such as right and left, to such disoriented travelers. Thus, conventional message delivery systems do not adequately provide a message content that distinguishes geographic points of interest on one side of a road from those on another.

SUMMARY OF THE INVENTION

Accordingly, it is an advantage of the present invention that an improved message delivery system and method are provided.

Another advantage of the present invention is that a flexible message delivery system which accommodates rapid and frequent message content changes is provided.

Another advantage is that the present invention is sufficiently flexible to be customized for a wide variety of areas having a high density of points of interest.

Another advantage is that the present invention provides a message delivery system in which messages are delivered in their entirety from beginning to end.

Another advantage is that the present invention provides a message delivery system in which messages are delivered without repetition.

Another advantage is that the present invention provides messages whose content may refer to geographic points of interest using left and right directional references.

Another advantage is that the present invention provides a message delivery system that may be located in public transportation and other vehicles and that does not rely upon driver involvement.

Another advantage is that the present invention provides a message delivery system having a simple, robust design that may be implemented at modest expense.

The above and other advantages of the present invention are carried out in one form by a method for distributing messages through a mobile unit. The method calls for obtaining a location for the mobile unit. A message identity is determined in response to this location. A message corresponding to the message identity is then delivered.

The above and other advantages of the present invention are carried out in another form by a method for distributing messages through mobile units which calls for receiving, at a mobile unit, a radio communication that conveys a message. A beginning of the message is detected, and a delivery system is activated in response to the beginning of the message. The delivery system is used to deliver the message. An end of the message is detected, and the delivery system in deactivated in response to the end of the message.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
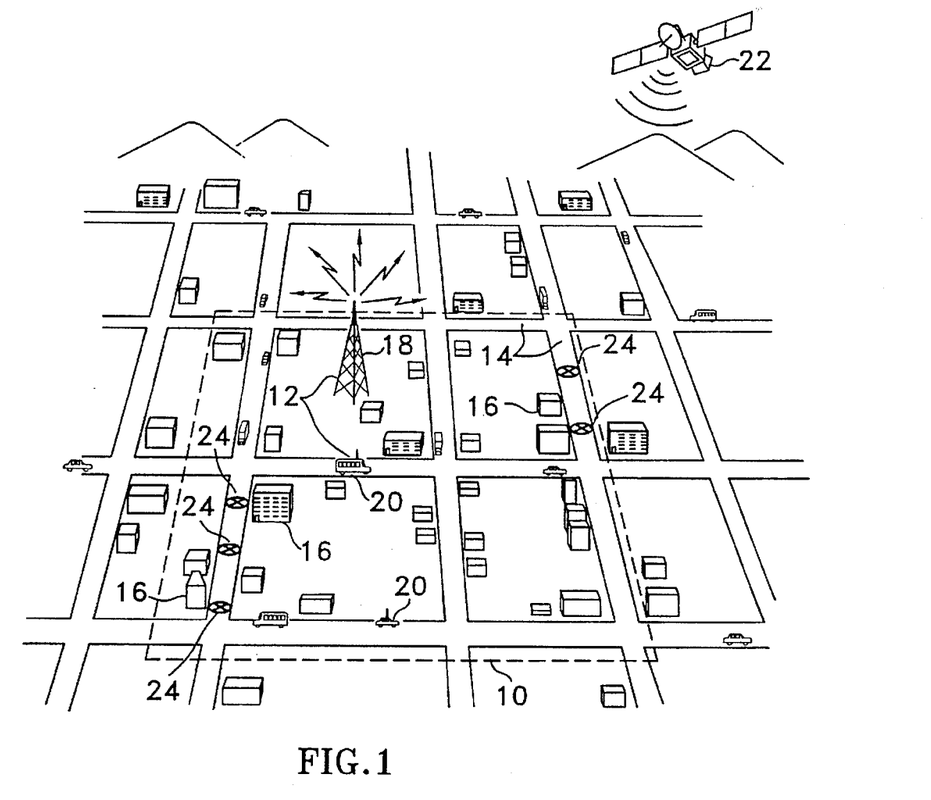
FIG. 1 shows a schematic view of a geographic area covered by a message delivery system configured in accordance with the teaching of the present invention.

FIG. 1 shows a schematic view of a geographic area 10 covered by a message delivery system 12. Area 10 has a network of roads 14 and any number of points of interest 16. System 12 includes a control station 18 and any number of mobile units 20. Control station 18 broadcasts radio frequency communications which may be received throughout area 10. Mobile units 20 can freely move about within area 10 and elsewhere. In the preferred embodiments of the present invention, mobile units 20 are configured to obtain data that describe their current locations. Such data may be obtained by receiving signals from a location determination system 22, such as the Global Positioning System (GPS), Loran, or the like. Through system 12, messages are delivered from mobile units 20. System 12 may deliver a variety of messages having diverse contents. Specific messages are delivered at specific locations within area 10. Desirably, the content of each message relates to the location within area 10 from where the message is delivered.

System 12 may be adapted to a wide variety of areas 10. The preferred embodiments of system 12 are desirably adapted for use in connection with a city that may be favored by a large number of tourists. Thus, public transportation is likely to be readily available, numerous businesses and other enterprises vie for tourist attention, and tourists desire information which describes area 10 and its points of interest 16. However, system 12 is versatile and may be adapted to other types of areas 10.

Likewise, the present invention places no requirements on what points of interest 16 are. In the preferred embodiments, points of interest 16 are typically businesses, such as hotels, resorts, casinos, shopping centers, restaurants, museums, sports facilities, and the like, that vie for tourist business or have a specific message to give patrons, customers, visitors, and the like. Thus, the messages that system 12 delivers may be business advertisements that are presented when mobile units 20 are near the businesses. However, the present invention is not limited to just these points of interest 16 or messages. For example, points of interest 16 may have civic, historical, or public service importance, and the messages may simply provide related information.

Control station 18 broadcasts the messages in real time and manages the programming of mobile units 20. Control station 18 may be located anywhere, but preferably has transmitter antennas positioned so that the transmission range includes all points of interest 16 addressed by system 12. Control station 18 is discussed below in more detail in connection with FIGS. 2–4.

In the preferred embodiments, mobile units 20 are installed in conventional public transportation vehicles, such as taxi cabs, buses, trolleys, limousines, shuttle vans, and the like. But, this is not a requirement of the present invention. Mobile units 20 are configured to determine their locations, to selectively receive the messages transmitted by control station 18, to selectively deliver these messages from beginning to end without repetition, at least within a predetermined interval, and to alter their programming in response to over-the-air instructions received from control station 18. Mobile units are discussed in more detail below in connection with FIGS. 5–8.

Que points 24 are identified for use by system 12 on a point by point basis. Que points 24 represent locations within area 10 which, when passed by mobile units 20, queue the delivery of messages. Thus, que points 24 correspond to points of interest 16. Each point of interest 16 is associated with at least one que point 24. In the preferred embodiments of the present invention, que points 24 represent location data only. System 12 requires no devices to be positioned at que points 24 or their corresponding points of interest 16. Thus, system 12 does not suffer the complexity associated with obtaining permission to locate devices at or near que points 24, installing devices at or near que points 24, or providing power to such devices. Rather, system 12 only needs information describing the locations of que points 24.

Desirably, que points 24 are defined to slightly precede the corresponding point of interest 16 when a mobile unit 20 travels in a particular direction. If a mobile unit 20 traveling in the opposite direction passes a que point 24, the corresponding point of interest 16 is not upcoming but has already been passed. Since the corresponding point of interest 16 follows the que point 24 when traveling in the particular direction, a relative direction, such as left or right, to the point of interest 16 is indicated. In other words, when a mobile unit 20 passes a que point 24, if the corresponding point of interest 16 lies ahead of the mobile unit 20, it will lie in a known relative direction, either left or right, of the particular direction of travel for the mobile unit 20. Thus, a message delivered in relation to this point of interest 16 may refer to the point of interest 16 using a relative directional term, such as left or right.

The use of relative directional terms, such as left and right, in messages is a desirable feature. A directional reference in a message focuses a traveler's attention on the precise point of interest 16 to which a message may relate. This enhances the impact that a given message may have upon the traveler. Moreover, in tourist applications, tourists are often directionally disoriented due to unfamiliar surroundings, aircraft travel, and other factors. The use of absolute directional references, such as north, south, east, and west, would be inappropriate and even frustrating because a vast number of tourists to whom the messages are directed would not know to where such absolute directions are referring. It is the positioning of que points 24 prior to corresponding points of interest 16 that allows the present invention to deliver messages which use such relative directional references.

Figure 2:
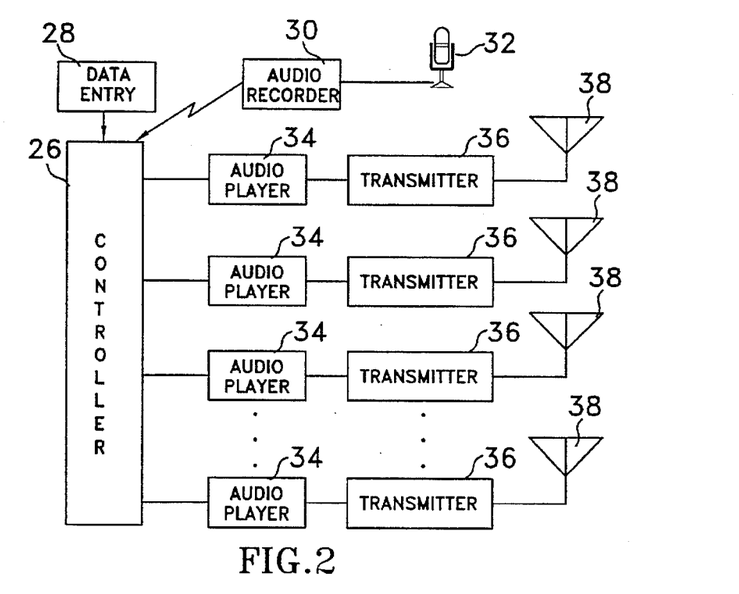
FIG. 2 shows a block diagram of a control station used by the message delivery system.

FIG. 2 shows a block diagram of a control station 18. Control station 18 includes a controller 26, which may represent a conventional computer. Controller 26 includes or couples to a data entry section 28 through which data are entered into controller 26. The locations of que points 24

(see FIG. 1) and unique identity codes associated with the messages represent two types of data which are entered through data entry section 28. In addition, an audio recorder 30 couples to controller 26, and a microphone 32 couples to audio recorder 30. Controller 26 also couples to any number of audio players 34, and audio players 34 couple to their own transmitters 36. Each transmitter 36 couples to its own antenna 38, or alternatively, outputs from each transmitter 36 may be combined (not shown) for broadcast from a common antenna 38.

The messages delivered by system 12 are recorded through microphone 32 by audio recorder 30. No restrictions are placed upon the content of the messages. However, as discussed above the messages desirably refer to points of interest 16 (see FIG. 1), and they desirably use relative directional terms, such as left and right. In various modes of operation permitted by control station 18, different messages may be delivered in different types of vehicles for the same points of interest 16. In addition, different messages may be delivered for the various points of interest 16 when approached from different directions.

These messages are formatted through controller 26 and combined into packets or communications which are played at audio players 34 and broadcast from antennas 38 in accordance with a schedule that is managed by controller 26. While FIG. 2 illustrates the use of audio players 34 for clarity, those skilled in the art will appreciate that the messages and the communications which convey the messages may alternatively be stored in an entirely digital form within controller 26.

In the preferred embodiments, each transmitter 36 is configured to broadcast on different radio frequency channels. These channels are desirably, but not necessarily, located in the UHF band. The communications, which include messages, are simultaneously broadcast through these channels. In addition, various messages may be arranged sequentially so that a particular channel may broadcast a few different messages in sequence, then repeat the sequence.

Control station 18 allows great flexibility in the delivery of messages. No limits are placed upon the number of messages, the duration of messages, or upon the number of simultaneously operating channels. Each message can have a different duration. Moreover, the message content can change instantly. For example, nothing prevents entire sets of messages delivered by system 12 from changing in accordance with the time of day. This mode of operation may be desirable, for example, to deliver longer messages during a rush hour when mobile units 20 typically move more slowly and shorter messages at other times when mobile units 20 typically move faster.

Figure 3:
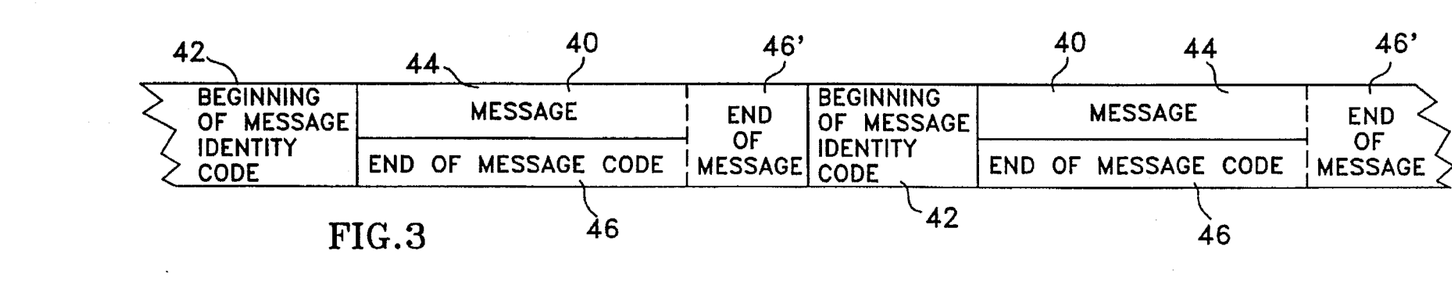
FIG. 3 shows a data format diagram of a first type of communication broadcast from the control station.

FIG. 3 shows a data format diagram for two typical message communications 40 sequentially broadcast in a single channel by control station 18. Controller 26 (see FIG. 2) formats and schedules the communications 40. As discussed above, other message communications 40 may be simultaneously transmitted in other channels. Each message communication 40 desirably includes a beginning data code 42 that serves two roles. Data code 42, and other data transmitted from control station 18, may be encoded for transmission in any conventional manner. For example, data code 42 may be encoded using conventional paging signals, MODEM tones, DTMF tones, and the like.

In one role, data code 42 conveys a message identity that serves as an index for a message 44 being delivered by the communication 40. Desirably, data code 42 uniquely identifies message 44 within the set of all messages delivered by system 12. However, in alternative embodiments, data code 42 taken together with an identity for the channel over which the message 44 is being transmitted, may form a unique identifier.

In another role, data code 42 serves as an indicator for the beginning of message 44. Message 44 begins at the end of data code 42. Thus, as soon as a mobile unit 20 (see FIG. 1) detects a data code 42, it may activate a message delivery system to enable delivery of the message 44 starting at the beginning of the message.

Message 44 is desirably a conventional audio signal that is transmitted in real time. In other words, a mobile unit 20 (see FIG. 1) may annunciate message 44 throughout the duration of message 44 within communication 40. This delivers message 44 in its entirety from beginning to end.

In one embodiment, an end of message code 46 represents a sub-audible, low frequency tone that control station 18 (see FIG. 2) broadcasts simultaneously with message 44. For the most part, code 46 is not heard by a traveller listening to message 44. When end of message code 46 ceases, a mobile unit 20 (see FIG. 1) may conclude that the end of message 44 has occurred and deactivate its delivery system to prevent repetition and/or the delivery of inappropriate messages. In an alternate embodiment, an end of message code 46' represents a data code that follows message 44. When a mobile unit 20 detects an end of message code 46', the mobile unit 20 may conclude that the end of message 44 has occurred. Although FIG. 3 depicts both end of message codes 46 and 46', system 12 desirably uses only one.

Figure 4:
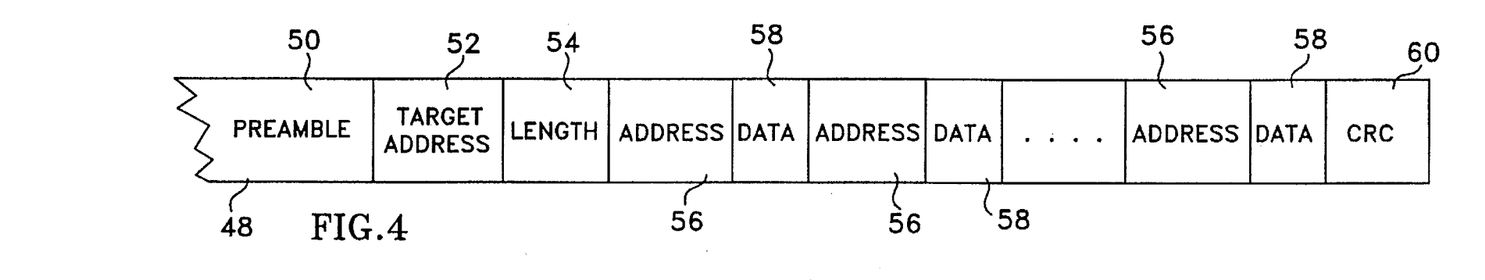
FIG. 4 shows a data format diagram of a second type of communication broadcast from the control station.

FIG. 4 shows a data format diagram for a programming communication 48 broadcast in any channel by control station 18 (see FIG. 2). Controller 26 (see FIG. 2) formats and schedules the communications 48. Communications 48 may be broadcast at any time when it is advantageous for the operation of system 12.

Communication 48 is a data communication that does not convey a message. As shown in FIG. 4, communication 48 may include a preamble 50, followed by a target address 52. Target address 52 identifies a mobile unit 20 or a class of mobile units 20 to which the programming communication 48 is directed. For example, target address 52 may specify a unique, individual mobile unit ID. Alternatively, target addresses 52 may specify one of various classes of mobile units 20. Such classes may, for example, distinguish bus mobile units 20 from cab or limousine mobile units 20. In addition, one class may refer to all mobile units 20.

A length code 54 may follow target address 52. Length code 54 may specify the length of communication 48 so that mobile units 20 can identify the end of communication 48. Next, communication 48 includes various sets of addresses 56 and related data 58. Addresses 56 specify where in a memory of mobile unit 20 the related data 58 are to be stored. Finally, communication 48 conveys an error detection/correction code, such as a CRC code 60. CRC code 60 can be used by mobile units 20 to verify that communication 48 was accurately received.

Figure 5:
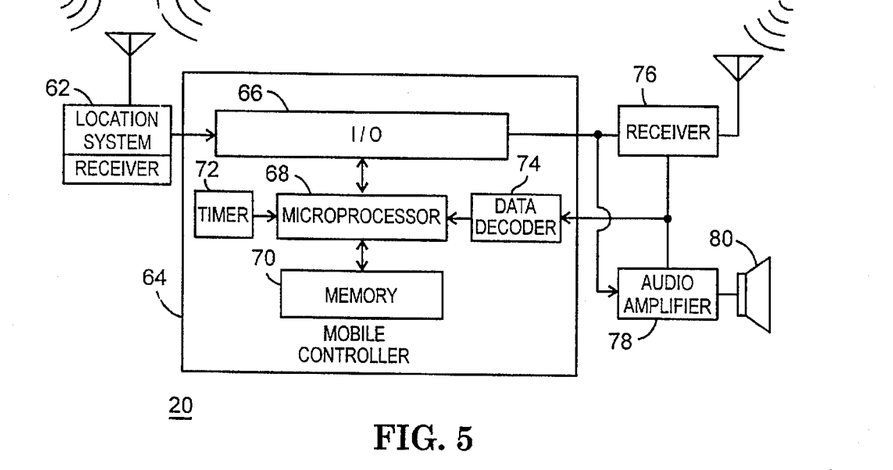
FIG. 5 shows a block diagram of a mobile unit used by the message delivery system.

FIG. 5 shows a block diagram of a mobile unit 20 used in system 12 (see FIG. 1). In the preferred embodiments, all mobile units 20 are configured in substantially the same way. Thus, the below-presented discussion related to a single mobile unit 20 also relates to all mobile units 20 within system 12. As discussed above, system 12 may include any number of mobile units 20, and mobile units 20 are desirably mounted in vehicles that are free to roam throughout area 10 and elsewhere.

Mobile unit 20 includes a location system receiver 62 that is compatible with location determination system 22 (see FIG. 1). In the preferred embodiments, location system receiver 62 is a GPS receiver which generates location data in latitude and longitude form. Location system receiver 62 couples to a mobile unit controller 64, and particularly to an input/output (I/O) section 66 of controller 64. Controller 64 additionally includes a microprocessor 68 which couples to I/O section 66, to a memory 70, to a timer 72, and to a data decoder 74. I/O section 66 of controller 64 additionally couples to a data input of an electronically tunable receiver 76 and to a control input of an audio amplifier 78. Receiver 76 has an audio output that couples to data decoder 74 of controller 64 and to an audio input of audio amplifier 78. An output of audio amplifier 78 couples to a loudspeaker 80.

Controller 64 uses its timer 72 to help keep track of real time and to maintain the current time. Memory 70 includes data which serve as instructions to microprocessor 68 and which, when executed by microprocessor 68, cause mobile unit 20 to carry out procedures which are discussed below. In addition, memory 70 includes variables, tables, and databases that are manipulated in accordance with the operation of mobile unit 20.

Receiver 76 is compatible with the communication channels over which control station 18 (see FIGS. 1-2) broadcasts. The particular channel to which receiver 76 is tuned at any instant is controlled through data supplied from controller 64 under the influence of programming instructions. Receiver 76 receives communications 40 (see FIG. 3) and 48 (see FIG. 4) transmitted by control station 18, and provides audio baseband signals corresponding to these communications. Data decoder 74 of controller 64 detects the various data codes which may be present in various parts of these communications, and provides such data codes to microprocessor 68. In addition, the baseband audio signal is routed to audio amplifier 78 where it is amplified to drive loudspeaker 80. However, the amplification performed by amplifier 78 is enabled by data from I/O section 66. Such control data activates or deactivates amplifier 78 so that loudspeaker 80 produces sound only when activated.

In the presently preferred embodiments of the present invention, the messages delivered by system 12 (see FIG. 1) are audio messages. Thus, audio amplifier 78 serves the role of a delivery system for mobile unit 20. However, in other embodiments, messages may be visual text messages annunciated at a display or video messages presented at a monitor. In such embodiments, the mobile unit's delivery system may be an appropriate display, video monitor, or the like.

Figure 6:
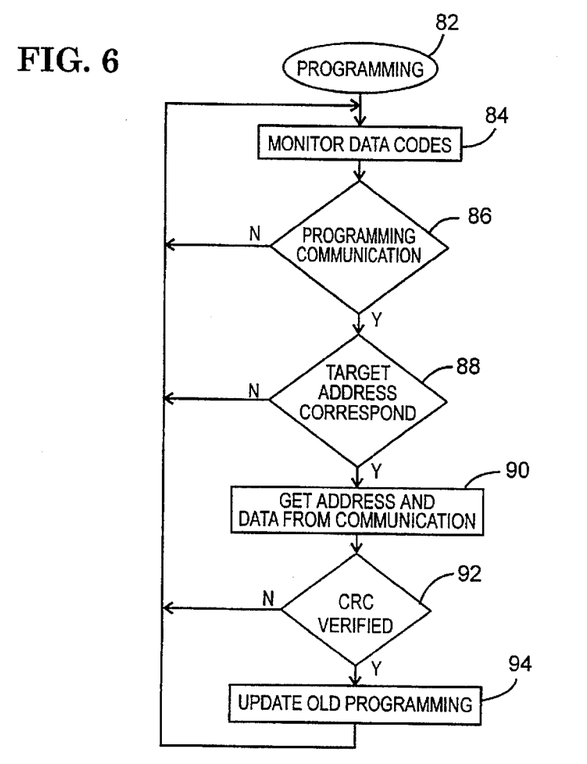
FIG. 6 shows a flow chart of a programming procedure performed by the mobile unit.

FIG. 6 shows a flow chart of a programming procedure 82 performed by mobile unit 20. Generally, procedure 82 is performed to obtain programming data from control station 18 (see FIGS. 1-2) and to program mobile unit 20 in accordance with the programming data. Procedure 82 may be performed in accordance with a predetermined schedule, such as from 3:00-3:15 AM every day, and the timing parameters of this schedule may themselves be the subject of over the air programming. Alternatively, procedure 82 may be continuously performed in a background mode so that programming may take place at any time for any reason.

Procedure 82 performs a task 84 to monitor data codes being received by receiver 76 (see FIG. 5). In particular, task 84 causes microprocessor 68 (see FIG. 5) to monitor data decoder 74 (see FIG. 5). No tuning of receiver 76 is performed, and task 84 monitors the channel to which receiver 76 is currently tuned. However, if procedure 82 is performed on a schedule, receiver 76 may be instructed to tune to a specified channel (not shown).

Next, a query task 86 determines whether a received data code indicates the reception of a programming communication 48 (see FIG. 4). A communication 48 may be identified when preamble 50 (see FIG. 4) is detected. When no programming communication 48 is detected, program control loops back to task 84. Program control remains in a programming loop that includes tasks 84 and 86 until a programming communication 48 is detected at task 86. However, if procedure 82 is being performed on a schedule, a test (not shown) may be included to break the loop at a specified time.

When task 86 detects a programming communication 48, a query task 88 evaluates the target address 52 (see FIG. 4) of the communication 48 to determine if it corresponds to the particular mobile unit 20 performing task 88. As discussed above, target address 52 may correspond to the mobile unit 20 by specifying the mobile unit's unique ID, or a class to which the mobile unit 20 has been assigned. Such ID and class assignment may be set forth through appropriate programming of memory 70 (see FIG. 5). When task 88 fails to detect correspondence with target address 52, program control loops back to task 84. No programming of the mobile unit 20 will occur.

However, when task 88 detects correspondence with target address 52, a task 90 collects all addresses 56 and data 58 from communication 48 (see FIG. 4) and stores them in a temporary buffer in memory 70 (see FIG. 5). After task 90, a query task 92 obtains and verifies CRC code 60 (see FIG. 4) from message 48. If CRC does not verify, the programming communication 48 is assumed to have been received inaccurately, and program control loops back to task 84. No programming of the mobile unit 20 occurs. When task 92 verifies CRC, a task 94 updates old programming in memory 70 (see FIG. 5) of mobile unit 20. After task 94, program control loops back to task 84.

In order to enhance the likelihood that mobile unit 20 receives accurate programming, control station 18 may desirably repeat programming communications 48. Then, after several repetitions system 12 may conclude that, to a high degree of confidence, the affected mobile units 20 have been programmed. If a mobile unit 20 fails to accurately receive a first repetition of a programming communication 48, it may receive a subsequent one.

Figure 7:
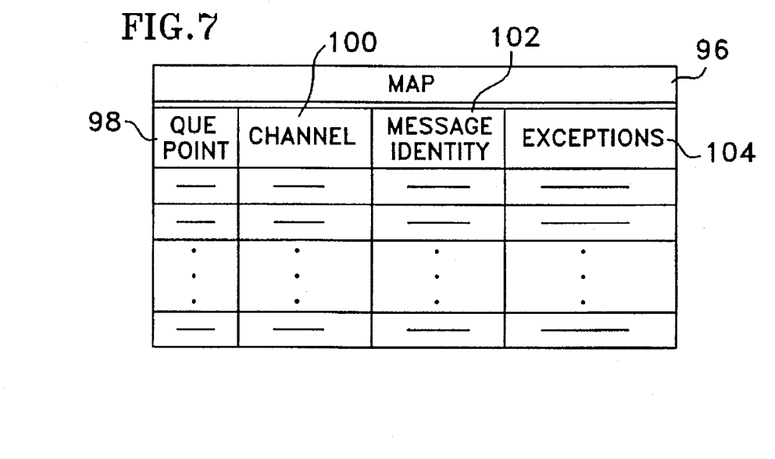
FIG. 7 shows a block diagram of an exemplary map structure maintained in a memory of the mobile unit.

FIG. 7 shows a block diagram of a map structure 96 maintained in memory 70 of mobile unit 20. Map 96 is presented in the form of a table. Map 96 is shown because it is likely to be reprogrammed through programming communications 48 (see FIG. 4) from time to time through the normal operation of system 12 (see FIG. 1). However other items, such as an internal clock, various timing variables, and programming instructions may be reprogrammed as well.

Map 96 includes a list 98 of que points 24 (see FIG. 1). The que points 24 included in map 96 are the locations, expressed for example in latitude and longitude form, of the que points 24 to which mobile unit 20 will respond by delivering a message. Nothing requires all que points 24 recognized by system 12 to be included in list 98. Table 96 also associates various other items of delta with each que point 24 included in list 98. For example, each que point 24 in list 98 has a channel number 100, and a message identity 102 associated therewith. Channel number 100 identifies a channel to which receiver 76 (see FIG. 5) may be tuned to receive a message for a point of interest 16 (see FIG. 1) that corresponds to the que point 24. Message identity 102 specifies the message which relates to the point of interest 16. Thus, if several messages are being sequentially broadcast over the identified channel, the message identity 102 defines which of the several messages relates to a que point 24. Nothing requires all mobile units 20 to have identical message identities or channel numbers specified for like que points 24.

In addition, table 96 includes various exceptions 104 in association with the que points 24 included in list 98. Exceptions 104 are data that correspond to previously delivered messages. Such data may describe the previous message identity or que point 24. Exceptions 104 are used by mobile unit 20 to prevent the delivery of inappropriate messages. As discussed above, que points 24 are located before a corresponding point of interest 16 when a mobile unit 20 travels in a specified direction. However, when the mobile unit 20 travels in the opposite direction, the corresponding point of interest has already been passed when the que point 24 is encountered. The delivery of messages related to such passed, rather than upcoming, points of interest may be considered inappropriate. As discussed above, by limiting messages to upcoming points of interest 16, message content may refer to a point of interest 16 through a relative direction, such as left or right.

A special case exception that may be handled through table 96 or through special programming instructions relates to the same que point 24. If the que point 24 included in list 98 is duplicated in the associated exceptions 104, then the immediate repeated delivery of messages may be prevented. Repetitions of messages may otherwise occur if a mobile unit is stuck in traffic near a que point 24.

Figure 8:
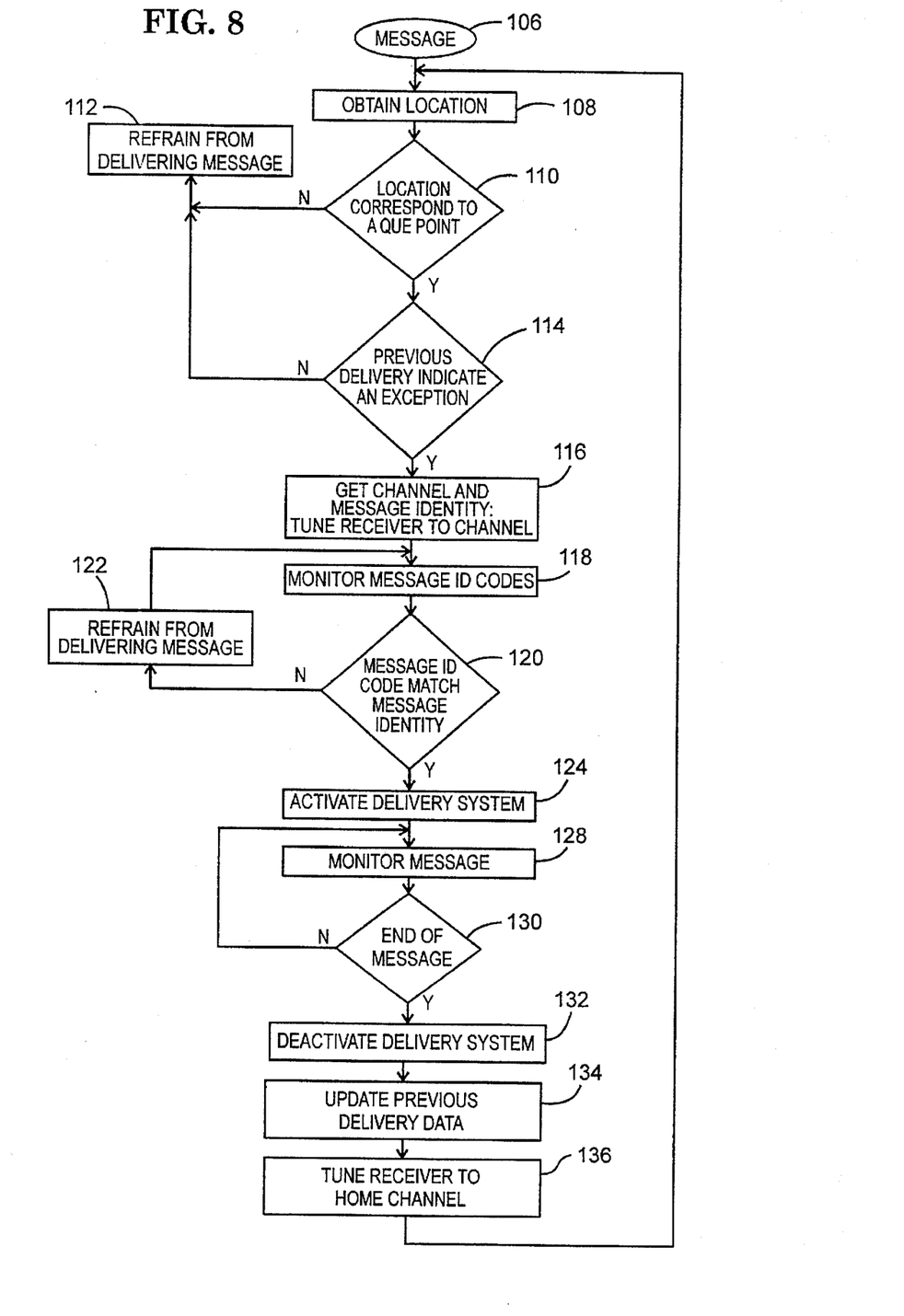
FIG. 8 shows a flow chart of a message procedure performed by the mobile unit.

FIG. 8 shows a flow chart of a message procedure 106 performed by mobile unit 20. Generally, procedure 106 is performed in a foreground mode to detect when que points 24 (see FIG. 1) are encountered and to deliver the messages associated with the que points 24.

Procedure 106 performs a task 108 to obtain a current location for mobile unit 20. The location may be obtained from location system receiver 62 (see FIG. 5) and may be in latitude and longitude form. After task 108, a query task 110 evaluates this location to determine if it corresponds to a que point 24 included in list 98 of table 96 (see FIG. 7). Task 110 may repetitively perform a distancing calculation between the location obtained in task 108 and the que points from list 98 until either a corresponding que point 24 is discovered in list 98 or until all que points 24 in list 98 have been evaluated. This distancing calculation may, for example, determine whether the location obtained above in task 108 is within 100–200 feet of a que point 24.

If task 110 determines that no que point 24 in list 98 corresponds to the current location for mobile unit 20, program control loops back to task 108. As indicated at a block 112, mobile unit 20 refrains from delivering any message for the current location. If task 110 finds correspondence between a que point 24 and the current location, a query task 114 determines whether an exception is indicated for the identified que point 24. An exception may be determined by consulting the que point list 98 and/or exceptions 104 (see FIG. 7) associated with the identified que point 24 and comparing the exceptions with data that identify a previously delivered message. As discussed above, an exception is programmed to prevent delivery of a message. Such exceptions may occur when travel in a direction opposing message orientation occurs or when a message is being repeated. If an exception is detected, program control loops back to task 108. As indicated at block 112, delivery of repeat and other inappropriate messages is prevented.

When task 114 determines that no exception is indicated, a task 116 examines the record of table 96 (see FIG. 7) that has been selected in response to current mobile unit location and identifies the communication channel 100 (see FIG. 7) and message identity 102 (see FIG. 7) associated with the current que point 24. In addition, task 116 tunes radio receiver 76 (see FIG. 5) to the indicated channel. After task 116, a task 118 then monitors beginning of message ID codes 42 (see FIG. 3) received on the channel to which receiver 76 has been tuned. Task 118 monitors the message ID codes 42 by evaluating data decoder 74 (see FIG. 5).

Next, a query task 120 determines whether the last received message ID code 42 matches the message identity 102 (see FIG. 7) obtained above in task 116. When task 120 fails to find a match, program control loops back to task 118. As indicated at a block 122, mobile unit 20 refrains from delivering any message. Program control remains in a loop including tasks 118 and 120 until a received beginning of message ID code 42 matches the message identity 102. However, a time out test (not shown) may be included to break the loop should a match not be found within a predetermined period of time.

When a match is detected at task 120, a task 124 activates the message delivery system provided by audio amplifier 78 (see FIG. 5). After task 124, message 44 (see FIG. 3) will be delivered. Concurrent with the delivery of message 44, a task 128 continues to monitor message communication 40 (see FIG. 3) for end of message code 46 or 46' (see FIG. 3). A query task 130 determines whether an end of message has occurred. As discussed above, end of message code 46 represents a sub-audible tone communicated during message 40. The removal or absence of end of message code 46 signals the end of message 40. End of message code 46' represents a digital code that follows message 40. The detection of end of message code 46' signals the end of message 40. If no end of message is detected, program control loops back to task 128. However, when an embodiment using end of message code 46' is implemented, a time out test (not shown) may be included to break the loop should no end of message code 46' be detected within a predetermined period of time.

When task 130 detects the end of message 40, a task 132 deactivates the message delivery system provided by audio amplifier 78 (see FIG. 5). The deactivation of the message delivery system prevents any message from being delivered until the message delivery system is re-activated. After task 132, a task 134 saves, in memory 70 (see FIG. 5), data describing the message just delivered. These data may convey a message identity 102 (see FIG. 7), que point list 98 (see FIG. 7) or other identifying data. These data are evaluated in task 112, discussed above.

In one embodiment of the present invention, a watch dog alarm timer may be set (not shown) whenever task 134 is performed. If this watch dog alarm timer expires, other programming (not shown) clears the data written during task 134. The result of this feature is that a que point 24 that might have been considered an exception, such as for a repeat message or a wrong orientation message, will not be considered an exception at task 112 if a sufficient amount of time has passed since the previous message delivery.

After task 134, a task 136 tunes radio receiver 76 (see FIG. 5) to a predetermined "home" channel. Thus, receivers 76 are tuned to their home channels except when they are listening for or delivering a specific message. This allows control station 18 (see FIGS. 1–2) to broadcast programming communications 48 (see FIG. 4) on only the home channel and still have a high probability of successfully reprogramming mobile units 20. After task 136, programming control loops back to task 108 to monitor the current locations of mobile unit 20 for other que points 24.

In summary, the present invention provides an improved message delivery system and method. The message delivery system of the present invention is sufficiently flexible to adapt to a wide variety of areas and situations and to accommodate rapid and frequent changes in programming and message content. In accordance with the present invention, messages are presented in their entirety from beginning to end without repetition. Message content may refer to geographic points of interest using left and right relative directional references. The message delivery system of the present invention may deliver messages in public transportation and other vehicles without reliance upon driver involvement. In addition, the above described preferred embodiments may be implemented with a relatively simple, robust design at modest expense.

The present invention has been described above with reference to preferred embodiments. However, those skilled in the art will recognize that changes and modifications may be made in these preferred embodiments without departing from the scope of the present invention. For example, the above-described preferred embodiments relate to a system where radio coverage of an entire area is accomplished through transmitters located at a central site. However, those skilled in the art could devise an equivalent cellular system that distributes multiple low power cells throughout the area of coverage. Moreover, the above-described preferred embodiments relate to a system where que points are located to dictate left and right relative orientations. In alternate equivalent embodiments, the mobile unit could track location data provided by the location determination system to determine direction of travel and whether a left or right orientation is appropriate for any given que point. Moreover, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. These and other changes and modifications which are obvious to those skilled in the art are intended to be included within the scope of the present invention.

What is claimed is:

1. A method for distributing messages through a mobile unit, said method comprising the steps of:
    a) obtaining a current location for said mobile unit, said mobile unit being capable of traveling within an area along a substantially unspecified route;
    b) determining, in response to said location, a message identity;
    c) detecting a beginning of message code;
    d) activating a message delivery system in response to said beginning of message code;
    e) delivering a message corresponding to said message identity;
    f) detecting an end of message code; and
    g) deactivating said message delivery system in response to said end of message code.

2. A method for distributing messages through a mobile unit, said method comprising the steps of:
    a) obtaining a current location for said mobile unit, said mobile unit being capable of traveling within an area along a substantially unspecified route;
    b) determining, in response to said location, a message identity;
    c) delivering a message corresponding to said message identity;
    d) determining if said location corresponds to a que point; and
    e) refraining from performing said steps b) and c) when said location does not correspond to a que point.

3. A method for distributing messages through a mobile unit, said method comprising the steps of:
    a) associating message identities with que points;
    b) obtaining a current location for said mobile unit, said mobile unit being capable of traveling within an area along a substantially unspecified route;
    c) determining if said location corresponds to one of said que points;
    d) when said location corresponds to one of said que points, obtaining the one of said message identities associated with said one of said que points; and
    e) delivering a message corresponding to said message identity.

4. A method for distributing messages through a mobile unit, said method comprising the steps of:
    a) obtaining a current location for said mobile unit, said mobile unit being capable of traveling within an area along a substantially unspecified route;
    b) determining, in response to said location, a message identity;
    c) recording data corresponding to a previously delivered message;
    d) evaluating said data corresponding to said previously delivered message to verify that delivery of a current message is allowed; and
    e) delivering said current message, said current message corresponding to said message identity.

5. A method for distributing messages through a mobile unit, said method comprising the steps of:
    a) obtaining a current location for said mobile unit, said mobile unit being capable of traveling within an area along a substantially unspecified route;
    b) identifying a radio communication channel in response to said location;
    c) tuning a radio receiver to said communication channel;
    d) determining, in response to said location, a message identity; and
    e) delivering a message corresponding to said message identity.

6. A method for distributing messages through a mobile unit, said method comprising the steps of:
    a) obtaining a current location for said mobile unit, said mobile unit being capable of traveling within an area along a substantially unspecified route;
    b) determining, in response to said location, a message identity;
    c) receiving a communication through a radio receiver, said communication conveying a message identity code;
    d) evaluating said received message identity code in comparison to said message identity determined in said step b); and e) delivering a message corresponding to said message identity.

7. A method as claimed in claim 6 wherein:

said communication conveys a received message in addition to said message identity code; and said method additionally comprises the step of refraining from delivering said received message when said evaluating step determines that said received message identity code does not correspond to said message identity determined in said step b).

8. A method for distributing messages through a mobile unit, said method comprising the steps of:

a) receiving, a radio programming communication which conveys a given location in association with a message identity;

b) recording said message identity in association with said given location;

c) obtaining a current location for said mobile unit, said mobile unit being capable of traveling within an area along a substantially unspecified route, and said current location substantially matching said given location;

b) determining, in response to said current location, said message identity; and c) delivering a message corresponding to said message identity.

9. A method for distributing messages through mobile units, said method comprising the steps of:

receiving, within a local area, a radio communication at one of said mobile units that conveys a message describing a point of interest within said local area, said mobile unit being proximate said point of interest during said receiving step;

detecting a beginning of said message;

activating, in response to said beginning of said message, a delivery system to deliver said message;

detecting an end of said message; and deactivating, in response to said end of said message, said delivery system.

10. A method as claimed in claim 9 additionally comprising the step of preventing immediate repetitive delivery of said message.

11. A method as claimed in claim 9 additionally comprising, prior to said receiving step, the steps of:

obtaining said location for said mobile unit; and determining, in response to said location, a message identity.

12. A method as claimed in claim 11 additionally comprising the steps of:

associating message identities with que points;

resolving whether said location corresponds to one of said que points; and when said location corresponds to one of said que points, obtaining the one of said message identities associated with said one of said que points.

13. A method as claimed in claim 12 wherein said radio communication additionally conveys a message identity code, and said method additionally comprises the steps of:

identifying, prior to said receiving step, a radio communication channel in response to said location;

tuning, prior to said receiving step, a radio receiver to said communication channel; and evaluating said received message identity code in comparison to said message identity determined in said determining step.

14. A method as claimed in claim 13 additionally comprising the step of refraining from activating said delivery system when said evaluating step determines that said received message identity code does not correspond to said message identity determined in said determining step.

15. A method for delivering messages having geographic contexts through mobile units as said mobile units pass geographic points to which said messages relate, said method comprising the steps of:

a) identifying geographic que points;

b) associating messages with said que points;

c) determining when one of said mobile units passes one of said que points, said one mobile unit being capable of substantially free movement about said que points;

d) identifying the passed one of said que points;

e) determining, in response to said step d), a message identity; and f) delivering a message corresponding to said message identity.

16. A method as claimed in claim 15 wherein:

said step a) comprises the step of locating said que points so that said que points are passed prior to passing corresponding geographic points when said mobile units travel in predetermined directions relative to said geographic points; and configuring content of said messages to identify left or right directions toward said geographic points relative to said predetermined directions.

17. A method as claimed in claim 16 additionally comprising the steps of:

determining when a que point passed by one of said mobile units is located after a geographic point to which it corresponds due to the direction which said mobile unit is traveling; and refraining from performing said step f) when said que point is located after said geographic point.

18. A method as claimed in claim 15 wherein:

said message has a beginning and an ending; and said step f) is configured to deliver said message only if said message can be delivered in its entirety from said message beginning to said message ending.

19. A method as claimed in claim 15 additionally comprising the step of preventing immediate repetitive delivery of said message.

20. A method as claimed in claim 19 wherein:

said method additionally comprises the step of recording data corresponding to a previously delivered message; and said preventing step comprises the step of evaluating said data corresponding to said previously delivered message to verify that delivery of said message is allowed.

21. A method as claimed in claim 15 additionally comprising the steps of:

identifying, in response to said step d), a radio communication channel;

tuning a radio receiver to said communication channel;

receiving a communication through said radio receiver, said communication conveying a message identity code; and evaluating, prior to said step f), said received message identity code in comparison to said message identity determined in said step e).

22. A system for distributing messages through a mobile unit capable of substantially free movement within a local area, said system comprising:

a location receiver for generating data describing a location for said mobile unit;

a mobile controller coupled to said location receiver, said mobile controller being configured to determine a message identity in response to said location; and a delivery device coupled to said mobile controller, said delivery device being configured to annunciate a message corresponding to said message identity, said message being configured to describe a point of interest within said local area, wherein said message is annunciated by said delivery device when said mobile unit is proximate said point of interest.

23. A system as claimed in claim 22 wherein:

said system additionally comprises a radio receiver coupled to said mobile controller; and said controller is configured to identify a radio communication channel in response to said location and to tune said radio receiver to said communication channel.

24. A system as claimed in claim 22 wherein:

said radio receiver receives a communication which conveys a message identity code; and said controller is configured to evaluate said received message identity code in comparison to said message identity determined in response to said location of said mobile unit.

* * * * *